United States Patent
Jing

(10) Patent No.: US 10,466,517 B2
(45) Date of Patent: Nov. 5, 2019

(54) RUBBING CLOTH ATTACHING DEVICE

(71) Applicants: BOE Technology Group Co., Ltd., Beijing (CN); Hefei BOE Optoelectronics Technology Co., Ltd., Anhui (CN)

(72) Inventor: Yangkun Jing, Beijing (CN)

(73) Assignees: BOE Technology Group Co., Ltd., Beijing (CN); Hefei BOE Optoelectronics Technology Co., Ltd., Hefei (CN)

( * ) Notice: Subject to any disclaimer, the term of this patent is extended or adjusted under 35 U.S.C. 154(b) by 395 days.

(21) Appl. No.: 15/215,059

(22) Filed: Jul. 20, 2016

(65) Prior Publication Data

US 2017/0023812 A1    Jan. 26, 2017

(30) Foreign Application Priority Data

Jul. 23, 2015  (CN) .......................... 2015 1 0443870

(51) Int. Cl.
*G02F 1/13* (2006.01)
*G02F 1/1337* (2006.01)
*B65H 35/06* (2006.01)

(52) U.S. Cl.
CPC ........... *G02F 1/1303* (2013.01); *B65H 35/06* (2013.01); *G02F 1/133784* (2013.01)

(58) Field of Classification Search
CPC . G02F 1/1303; G02F 1/133784; B65H 35/06; Y10T 156/1062
See application file for complete search history.

(56) References Cited

U.S. PATENT DOCUMENTS 4,762,040 A * 8/1988 Alcantara Perez ..... B24B 3/361
                                            451/420
5,620,544 A * 4/1997 Cram ................. B65H 19/2207
                                            156/184
(Continued)

FOREIGN PATENT DOCUMENTS

CN    101840109 A    9/2010
CN    202245489 U    5/2012
(Continued)

OTHER PUBLICATIONS

Aug. 2, 2016—(CN)—First Office Action Appn 201510443870.0 with English Tran.
(Continued)

*Primary Examiner* — Mark A Osele
*Assistant Examiner* — Christopher C Caillouet
(74) *Attorney, Agent, or Firm* — Banner & Witcoff, Ltd.

(57) ABSTRACT

A rubbing cloth attaching device including a bracket; a feeding device mounted at the bracket to deliver a rubbing cloth; a detection device mounted at the bracket to detect a delivery rate of the rubbing cloth; a cutting carrier device movably cooperating with the bracket; a cutting device movably mounted at the cutting carrier device; a first driving device configured to drive the cutting carrier device; a second driving device configured to drive the cutting device; and a control system configured to calculate a length of delivered rubbing cloth based on the delivery rate, and control the first driving device to drive the cutting carrier device to move in a delivering direction of the rubbing cloth at the delivery rate and control the second driving device to drive the cutting device to move in perpendicular to the delivering direction upon the calculated length reaching a first predetermined value.

11 Claims, 3 Drawing Sheets

(56) References Cited

U.S. PATENT DOCUMENTS

| | | | | |
|---|---|---|---|---|
| 9,889,533 B2* | 2/2018 | Jing | ............................ | B24B 7/10 |
| 2008/0254704 A1* | 10/2008 | Hamada | ................. | G02F 1/1303 |
| | | | | 445/24 |
| 2012/0211153 A1* | 8/2012 | Koshio | .................. | B26D 1/185 |
| | | | | 156/256 |
| 2012/0241077 A1* | 9/2012 | Hada | ..................... | G02F 1/1303 |
| | | | | 156/64 |

FOREIGN PATENT DOCUMENTS

| | | |
|---|---|---|
| CN | 202443222 U | 9/2012 |
| CN | 104020610 A | 9/2014 |
| CN | 104360542 A | 2/2015 |
| CN | 104570490 A | 4/2015 |
| CN | 104597663 A | 5/2015 |
| JP | 5228893 A | 7/2013 |

OTHER PUBLICATIONS

May 2, 2017—(CN) Third Office Action Appn 201510443870.0 with English Tran.
Dec. 15, 2016—(CN) Second Office Action Appn 201510443870.0 with English Tran.

* cited by examiner

RUBBING CLOTH ATTACHING DEVICE

This application claims priority to and the benefit of Chinese Patent Application No. 201510443870.0 filed on Jul. 23, 2015, which application is incorporated herein in its entirety.

BACKGROUND

Embodiments of present invention relate to a rubbing cloth attaching device.

A liquid crystal display (LCD) device includes a color filter (CF) substrate and an array substrate cell-assembled together as well as liquid crystal molecules filled between the CF substrate and the array substrate. The liquid crystal display device is the one in which an orientation of the liquid crystal molecule is regulated by an electric field for a frame display, wherein the liquid crystal molecules have to be oriented in a consistent way when no electric field is applied thereto. In order for a consistent orientation of the liquid crystal molecules, inner surfaces of the CF substrate and the array substrate are coated with orientation films.

In the manufacture process of orientation films, a rubbing process is required to be performed on the orientation film so that the orientation film can be provided with a capability of orientating the liquid crystals. Generally, the rubbing process is achieved by using a rubbing roller adhered with a rubbing cloth at a surface thereof to rub the orientation film. At present, most of the rubbing rollers are made manually in such a manner that workers cut a rubbing cloth and then paste the rubbing cloth onto the paste roller. However, cutting the rubbing cloth manually is very poor in the cutting accuracy and may cause an uneven cutting length of the rubbing cloth, which results in failure seams in the rubbing cloth when pasted onto the paste roller. When used in rubbing the orientation film, such a rubbing roller with failure seams may lead to uneven rubbing, and hence influence an orientation performed by the orientation film to the liquid crystal molecules.

Therefore, it is of vital importance in the filed of LCD devices to provide a rubbing cloth attaching device capable of cutting the rubbing cloth at a higher accuracy.

SUMMARY

Embodiments of the present invention provide a rubbing cloth attaching device which can cut the rubbing cloth at a high precision.

In order to achieve the above objective, the present invention provides technical solutions as below.

A rubbing cloth attaching device, including: a bracket; a feeding device mounted at the bracket and configured to deliver a rubbing cloth; a detection device mounted at the bracket, including a rate detection module configured to detect a delivery rate of the rubbing cloth; a cutting carrier device movably cooperating with the bracket; a cutting device movably mounted at the cutting carrier device; a first driving device configured to drive the cutting carrier device to move; a second driving device configured to drive the cutting device to move with respect to the cutting carrier device; and a control system configured to calculate a length of delivered rubbing cloth based on the delivery rate detected by the detection device, and to control the first driving device to drive the cutting carrier device to move in a delivering direction of the rubbing cloth at the delivery rate of the rubbing cloth and also control the second driving device to drive the cutting device to move in a direction perpendicular to the delivering direction of the rubbing cloth upon the calculated length of delivered rubbing cloth reaching a first predetermined value, so as to cut the rubbing cloth.

BRIEF DESCRIPTION OF THE DRAWINGS

Hereafter, the embodiments of the present invention will be described in detail with reference to the drawings, so as to make one person skilled in the art understand the present invention more clearly.

DETAILED DESCRIPTION

In order to make objects, technical details and advantages of the embodiments of the invention apparent, technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

Unless otherwise defined, all the technical and scientific terms used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not intended to define a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

Figure 1:
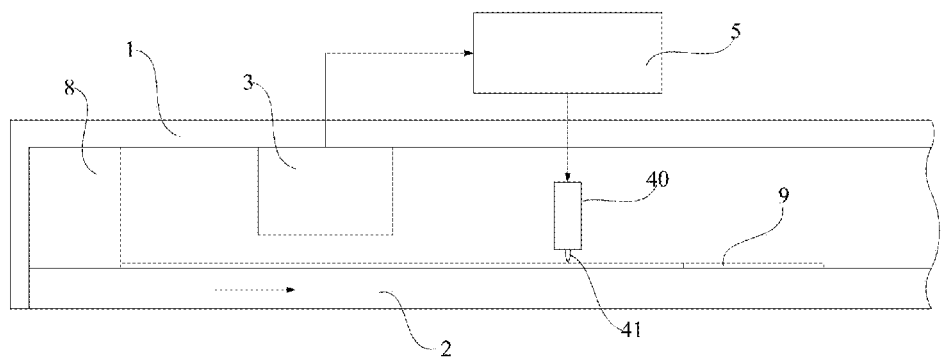
FIG. 1 is a schematically structural view illustrating a rubbing cloth attaching device provided by an embodiment of the present invention.
Figure 2:
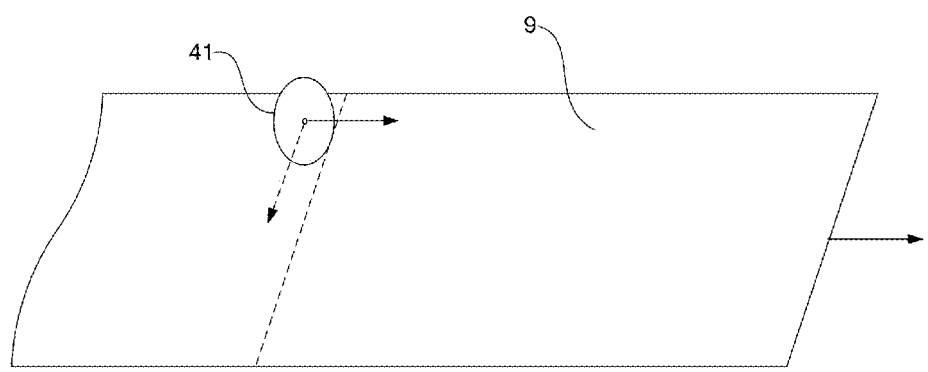
FIG. 2 is a schematic view illustrating a connection between a control system and other components in the rubbing attaching device provided by an embodiment of the present invention.

As illustrated in FIGS. 1-2, a rubbing cloth attaching device provided by an embodiment of present invention includes: a bracket 1; a feeding device 2 mounted at the bracket 1 and configured to deliver a rubbing cloth 9; a detection device 3 mounted at the bracket 1, including a rate detection module 30 configured to detect a delivery rate of the rubbing cloth 9; a cutting carrier device 40 movably cooperating with the bracket 1; a cutting device 41 movably mounted at the cutting carrier device 40; a first driving device 101 configured to drive the cutting carrier device 40 to move; a second driving device 102 configured to drive the cutting device 41 to move with respect to the cutting carrier device 40; and a control system 5 configured to calculate a length of delivered rubbing cloth 5 based on the delivery rate detected by the detection device 3, and to control the first driving device 101 to drive the cutting carrier device 40 to move in a delivering direction of the rubbing cloth 9 at the delivery rate of the rubbing cloth 9 and also to control the second driving device 102 to drive the cutting device 41 to move in a direction perpendicular to the delivering direction of the rubbing cloth 9 upon the calculated length of delivered rubbing cloth 9 reaching a first predetermined value, thereby cutting the rubbing cloth 9.

Figure 3:
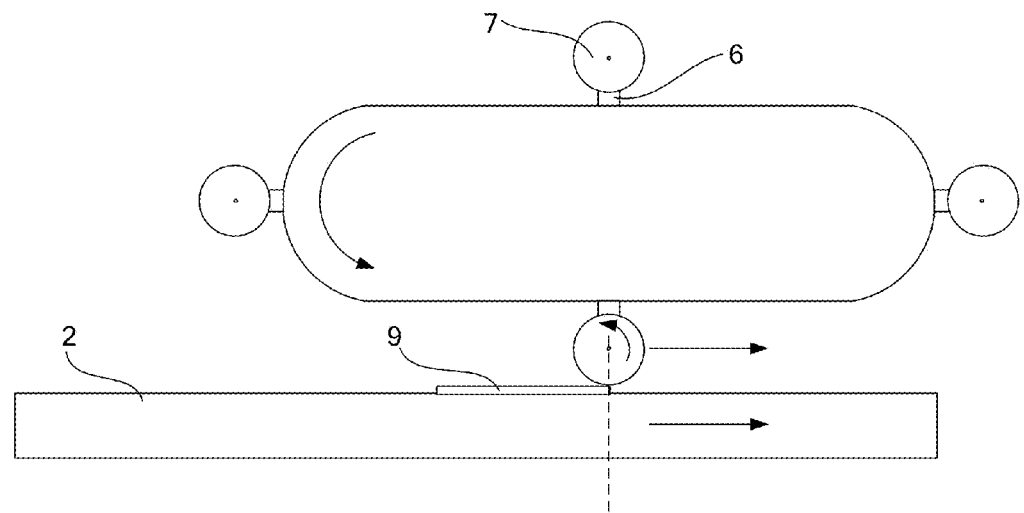
FIG. 3 is a schematic view illustrating a cloth-cutting process performed by a cutter wheel assembly of the rubbing cloth attaching device in FIG. 1.

In the rubbing cloth attaching device provided by the embodiment of present invention, the rate detection module 30 detects the delivery rate of the rubbing cloth 9; the control system 5 calculates a real-time, accurate, length value of delivered rubbing cloth 9 based on the delivery rate; upon the calculated length value of delivered rubbing cloth 9 reaching a cutting length, the control system 5 automatically controls the actions of the cutting carrier device 40 and the cutting device 41 so as to perform cutting. In this way, a relatively accurate cutting length of the rubbing cloth 9 is ensured; and as illustrated in FIGS. 2-3, the control system 5 can control the cutting device 41 to cut the rubbing cloth 9 at the same time when the cutting device is advancing synchronously with the rubbing cloth 9, by controlling a movement of the cutting carrier device 40 which is carried with the cutting device 41; thus it is possible to ensure a cutting position as captured on the rubbing cloth 9 is always correct, that is, it is possible to make a cutting edge of the rubbing cloth 9 formed during cutting being perpendicular to a length direction of the rubbing cloth 9, thereby a relatively even cut length of the rubbing cloth 9 can be obtained. According to the embodiment of the present invention, an error of the cutting length of the rubbing cloth 9 can be less than 0.1 mm.

In this way, the rubbing cloth attaching device provided by the embodiment of present invention can cut the rubbing cloth at a higher accuracy.

As illustrated in FIG. 1, the above feeding device 2 in one example can be a conveyor belt device.

As illustrated in FIG. 3, the above cutting carrier device 40 in one example can be implemented as a sliding block 40 mounted at the bracket 1 and can be slidable with respect to the bracket 1 in the delivering direction of the rubbing cloth 9; the above cutting device 41 in one example can be implemented as a cutter wheel assembly 41 mounted at the sliding block 40 and can be slidable with respect to the sliding block 40 in a direction perpendicular to the delivering direction of the rubbing cloth 9.

As illustrated in FIGS. 2-3, upon the rubbing cloth 9 delivered by the feeding device 2 reaching a certain length, that is to say, upon a length of the delivered rubbing cloth 9 obtained through calculation of the control system 5 based on the delivery rate detected by the detection device 3 reaching a first predetermined value, the control system 5 can control the first driving device 101 to drive the cutting carrier device 40 to move synchronously with the rubbing cloth 9 (for example, to advance in the direction indicated by the solid arrow illustrated in FIG. 3), and at the same time when the cutting carrier device 40 is advancing or after the cutting carrier device 40 has advanced for a certain distance by synchronizing with the rubbing cloth 9, the control system 5 further controls the second driving device 102 to drive the cutting device 41 to move in a direction perpendicular to the delivering direction of the rubbing cloth 9 (for example, the direction indicated by the dotted arrow illustrated in FIG. 3), that is, to drive the cutting device 41 to begin cutting the rubbing cloth 9. Since the cutting device 41 keeps moving forward synchronously with the rubbing cloth 9 along with the movement of the cutting carrier device 40 while perpendicularly cutting the rubbing cloth 9, it ensures real-time and also correct cutting directions and cutting locations of the rubbing cloth 9, thereby ensuring an even cutting length of the rubbing cloth 9. After the cutting device 41 has finished a single cloth-cutting process, the cutting carrier device 40 can return back to a location at which the rubbing cloth is to be cut.

In one example, at least one of the first driving device 101 and the second driving device 102 can include a screw-pair driving mechanism or a gear driving mechanism. Both the screw-pair driving mechanism and the gear driving mechanism are well-known in the prior art, with the detailed description thereof omitted herein. Of course, the first and second driving devices 101, 102 are not limited to the above driving mechanisms.

As illustrated in FIGS. 2-3, one example of the rubbing cloth attaching device provided by the embodiment of present invention can further include at least one rolling-attaching mechanism 6 movably cooperating with the bracket 1, the rolling-attaching mechanism 6 can include a mounting base at which a paste roller 7 is mounted and a third driving device 103 configured to drive the paste roller 7 mounted at the mounting base to rotate; accordingly, in this example, upon the length of the delivered rubbing cloth 9 obtained through the calculation of the control system 5 based on the delivery rate detected by the detection device 3 reaching a second predetermined value, the control system 5 can control the third driving device 103 to drive the paste roller 7 to rotate, thereby rolling and attaching the rubbing cloth 9 onto the paste roller 7.

As illustrated in FIG. 3, upon a cut surface at a front-end of the rubbing cloth 9 delivered by the feeding device 2 being aligned with a diameter in a vertical direction of the paste roller 7 (as indicated by the dotted line illustrated in FIG. 3), the length of the delivered rubbing cloth 9 obtained through the calculation of the control system 5 reaches the second predetermined value; at this time, the control system 5 can control the paste roller 7 to rotate, so that the paste roller 7 coated with glues at its surface can roll the rubbing cloth 9 up by keeping rotation after contacting with the rubbing cloth 9. Due to the fact that the control system 5 can precisely control a time when the paste roller 7 starts attaching the rubbing cloth and can control a rotating speed of the paste roller 7 for attaching the rubbing cloth, it is possible to ensure that all portions of the rubbing cloth 9 have uniform tensions during the cloth-attaching process; as a result, a surface of the rubbing cloth 9 attached onto the paste roller 7 is even, and cut faces at the front end and back end of the rubbing cloth can be jointed without a seam, which in turn improves a production yield of the rubbing roller. In addition, a plurality of rolling-attaching mechanisms 6 can be configured for use in recycle so that an assembly line for the cloth-attaching process of the paste roller 7 can be realized, and it is also possible to realize a mass production and thus improves the production efficiency.

As illustrated in FIG. 2, one example of the rubbing cloth attaching device provided by the embodiment of present invention can further include a fourth driving device 104 configured to drive the rolling-attaching mechanism 6 to move with respect to the bracket 1; in this example, the control system 5 can further be configured to control the action of the fourth driving device 104 to drive the rolling-attaching mechanism 6 to move in the delivering direction of the rubbing cloth 9 at a rate as same as the delivery rate of the rubbing cloth 9.

Figure 4:
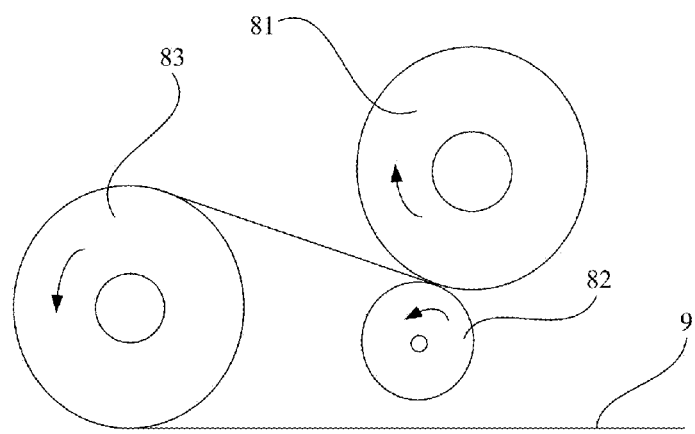
FIG. 4 is a schematic view illustrating a cloth-attaching process performed by a rolling-attaching mechanism of a rubbing cloth attaching device provided by another embodiment of the present invention.

As illustrated in FIGS. 2 and 4, upon the cut face at the front end of the rubbing cloth 9 delivered by the feeding device 2 being aligned with the diameter in the vertical direction of the paste roller 7 (as indicated by the dotted line illustrated in FIG. 4), the control system 5 can firstly control the third driving device 103 to drive the rolling-attaching mechanism 6 to advance synchronously with the rubbing cloth 9 (for example, to advance in the direction indicated by the solid arrow in FIG. 4), and at the same time or after this, the control system 5 also controls the fourth driving device 104 to drive the paste roller 7 mounted at the rolling-attaching mechanism 6 to perform cloth-attaching. Due to the fact that the paste roller 7 keeps advancing synchronously with the rubbing cloth 9 while performing the cloth-attaching, it is possible to prevent from an occurrence of "lift-out" in the cloth-attaching process, so as to avoid an uneven pasting of the rubbing cloth 9 onto the paste roller 7 or avoid generating wrinkles or greater slits between the cut faces at the front and back ends, thereby improving the production yield of the rubbing roller.

In one example, the third driving device 103 can include a driving motor; and/or the fourth driving device 104 can include a screw-pair driving mechanism or a gear transmission mechanism. The screw-pair driving mechanism, the gear transmission mechanism and the driving motor are all well-known in the prior art, with the detailed description thereof omitted herein. Of course, the third and fourth driving devices 103, 104 are not limited to the above driving mechanisms.

Figure 5:
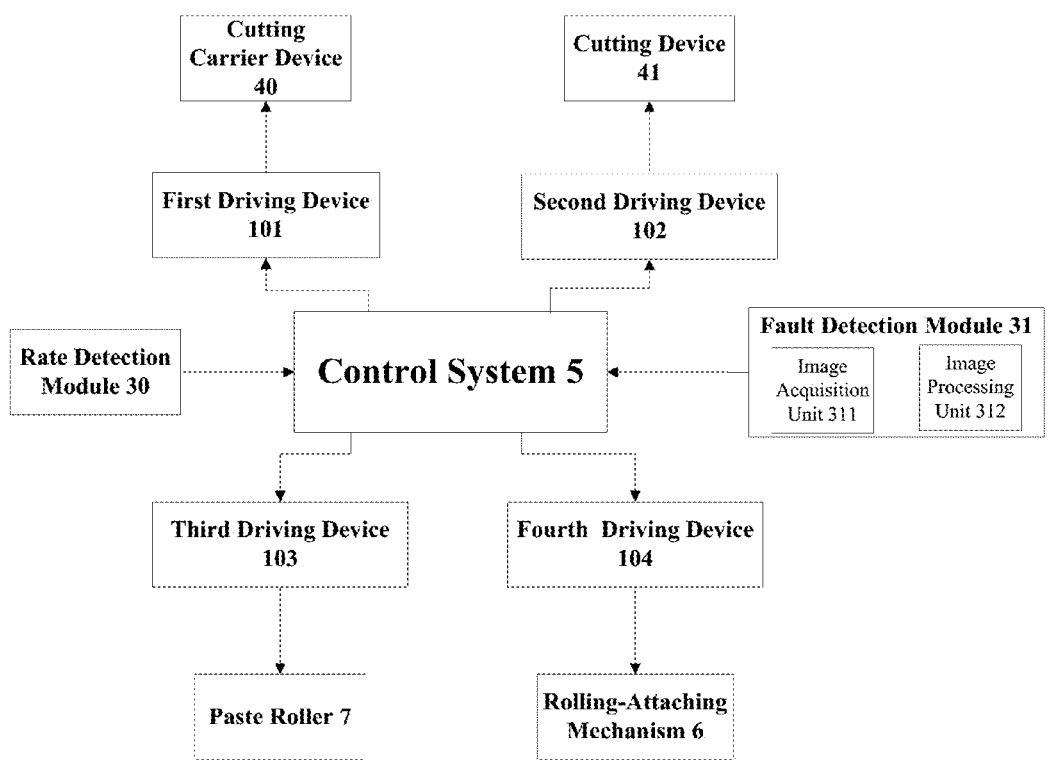
FIG. 5 is a schematically structural view illustrating a discharging device of the rubbing cloth attaching device provided by yet another embodiment of the present invention.

As illustrated in FIG. 1, one example of the rubbing cloth attaching device provided by the embodiment of present invention can further include a discharging device 8 mounted at the bracket 1. For example, as illustrated in FIG. 5, the discharging device 8 can include: a rubbing cloth roll 81; a shaving roller 82 disposed to be tangential to an edge of the rubbing cloth roll 81 and configured to scrape and press a surface of the rubbing cloth 9 to even the surface of the rubbing cloth 9; and a cloth guiding roller 83 configured to discharge the rubbing cloth 9. In the above discharging device, the shaving roller 82 can even the surface of the rubbing cloth 9, the cloth guiding roller 83 allows the discharged rubbing cloth 9 to have uniform tensions at all portions thereof. Consequently, the rubbing cloth 9 discharged by the discharging device 8 has a smooth surface, with all the portions thereof being relatively even; when used in rubbing an orientation film, such a rubbing cloth 9 allows the orientation film obtain to have an optimum in-plane homogeneity and stronger orientation capability.

The detection device 3 of the rubbing cloth attaching device provided by the embodiment of present invention can further include a fault detection module 31 configured to detect whether a fault exists in the delivered rubbing cloth 9, besides the rate detection module 30. When the fault detection module 31 detects a fault in the rubbing cloth 9, the control system 5 can control the first driving device 101, the second driving device 102, the third driving device 103 and the fourth driving device 104 to stop their driving operations, so that the cloth-cutting process and the cloth-attaching process can be stopped and then restarted after a portion of the rubbing cloth involving the fault as detected is removed, so as to avoid an imperfect rubbing roller to be produced.

In one example, the fault detection module 31 can include an image acquisition unit 311 configured to acquire an image of rubbing cloth and an image processing unit 312 configured to analyze and process the image of rubbing cloth.

The foregoing are merely specific embodiments of the invention, but not limitative to the protection scope of the invention. Within the technical scope disclosed by the present invention, any alternations or replacements which can be readily envisaged by one skilled in the art shall be within the protection scope of the present invention. Therefore, the protection scope of the invention shall be defined by the accompanying claims.

The present invention claims the benefits of Chinese patent application No. 201510443870.0, which was filed with the SIPO on Jul. 23, 2015 and is fully incorporated herein by reference as part of this application.

What is claimed is:
1. A rubbing cloth attaching device, comprising:
a bracket;
a feeding device mounted at the bracket and configured to deliver a rubbing cloth;
a detection device mounted at the bracket, comprising a rate detection module configured to detect a delivery rate of the rubbing cloth;
a cutting carrier device configured to movably cooperate with the bracket;
a cutting device movably mounted at the cutting carrier device;
a first driving device configured to drive the cutting carrier device to move;
a second driving device configured to drive the cutting device to move with respect to the cutting carrier device;
a control system connected to the detection device, the first driving device, and the second driving device, and configured to calculate a length of delivered rubbing cloth based on the delivery rate received from the detection device, and to send a first control signal to control the first driving device to drive the cutting carrier device to move in a delivering direction of the rubbing cloth at the delivery rate of the rubbing cloth and also send a second control signal to control the second driving device to drive the cutting device to move in a direction perpendicular to the delivering direction of the rubbing cloth upon the calculated length of delivered rubbing cloth reaching a first predetermined value, so as to cut the rubbing cloth;
at least one rolling-attaching mechanism configured to movably cooperate with the bracket, wherein the rolling-attaching mechanism comprises: a mounting base at which a paste roller is mounted; and a third driving device configured to drive the paste roller mounted at the mounting base to rotate, and wherein the control system is further connected to the third driving device and is configured to send a third control signal to control the third driving device to drive the paste roller to rotate upon the calculated length of delivered rub- bing cloth reaching a second predetermined value, so as to roll and attach the rubbing cloth onto the paste roller, and a fourth driving device configured to drive the rolling-attaching mechanism to move, wherein the control system is further connected to the fourth driving and is configured to send a fourth control signal to control the fourth driving device to drive the rolling-attaching mechanism to move in the delivering direction of the rubbing cloth at the delivery rate of the rubbing cloth.

2. The rubbing cloth attaching device according to claim 1, wherein the cutting device is a cutter wheel assembly mounted at the cutting carrier device, the cutter wheel assembly is configured to be slidable in the direction perpendicular to the delivering direction of the rubbing cloth.

3. The rubbing cloth attaching device according to claim 1, wherein at least one of the first driving device and the second driving device comprises a screw-pair driving mechanism or a gear driving mechanism.

4. The rubbing cloth attaching device according to claim 1, wherein the third driving device comprises a driving motor.

5. The rubbing cloth attaching device according to claim 4, wherein the fourth driving device comprises a screw-pair driving mechanism or a gear transmission mechanism.

6. The rubbing cloth attaching device according to claim 1, wherein the fourth driving device comprises a screw-pair driving mechanism or a gear transmission mechanism.

7. The rubbing cloth attaching device according to claim 1, further comprising a discharging device mounted at the bracket, the discharging device comprises:

a rubbing cloth roll;

a shaving roller disposed to be tangential to an edge of the rubbing cloth roll and configured to scrape and press a surface of the rubbing cloth so as to even the surface of the rubbing cloth; and a cloth guiding roller configured to export the rubbing cloth.

8. The rubbing cloth attaching device according to claim 1, wherein the feeding device is a conveyor belt device.

9. The rubbing cloth attaching device according to claim 1, wherein the detection device further comprises a fault detection module configured to detect whether a fault exists in the delivered rubbing cloth.

10. The rubbing cloth attaching device according to claim 9, wherein the fault detection module comprises:

an image acquisition unit configured to acquire an image of rubbing cloth; and an image processing unit configured to analyze and process the image of rubbing cloth.

11. The rubbing cloth attaching device according to claim 1, wherein the cutting carrier device is a sliding block mounted at the bracket and configured to be slidable on the bracket in the delivering direction of the rubbing cloth.

* * * * *